(12) United States Patent
Corby, Jr. et al.

(10) Patent No.: US 7,692,161 B2
(45) Date of Patent: Apr. 6, 2010

(54) SYSTEM AND METHOD FOR CORRECTING SPATIAL LUMINANCE VARIATION OF COMPUTED RADIOGRAPHY IMAGE PLATES

(75) Inventors: Nelson Raymond Corby, Jr., Scotia, NY (US); Clifford Bueno, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 75 days.

(21) Appl. No.: 11/953,122

(22) Filed: Dec. 10, 2007

(65) Prior Publication Data

US 2009/0146079 A1   Jun. 11, 2009

(51) Int. Cl.
*H05B 33/00* (2006.01)
(52) U.S. Cl. .................................. 250/484.4
(58) Field of Classification Search ........... 250/484.1, 250/484.4
See application file for complete search history.

(56) References Cited

U.S. PATENT DOCUMENTS

| | | | | |
|---|---|---|---|---|
| 4,963,751 | A | * | 10/1990 | Kano et al. .............. 250/484.4 |
| 5,301,108 | A | | 4/1994 | Hsieh |
| 2004/0169149 | A1 | * | 9/2004 | Alzner et al. ............ 250/484.4 |
| 2005/0003295 | A1 | * | 1/2005 | Koninckx et al. ........... 430/139 |

* cited by examiner

*Primary Examiner*—David P Porta
*Assistant Examiner*—Kiho Kim
(74) *Attorney, Agent, or Firm*—Joseph J. Christian

(57) ABSTRACT

A computed radiography plate including a substrate is provided. The computed radiography plate also includes at least one phosphor layer disposed above the substrate. The computed radiography plate also includes a protective layer disposed above the phosphor layer. The computed radiography plate further includes multiple patterns inscribed within at least one of the phosphor layer, the protective layer or the substrate.

23 Claims, 7 Drawing Sheets

SYSTEM AND METHOD FOR CORRECTING SPATIAL LUMINANCE VARIATION OF COMPUTED RADIOGRAPHY IMAGE PLATES

BACKGROUND

The invention relates generally to computed radiography, and more particularly, to correction of spatial luminance variation in computed radiography plates.

Typically, a computed radiography plate acts as a reusable X-ray image storage device. The computed radiography plate is initially exposed to X-ray radiation and placed into a reader for read-out and erasure. The plate is ready for a new X-ray exposure after erasure. During read-out of a computed radiography plate, an initial pixel array representing stored X-ray intensities over the plate must be corrected to account for various stationary, spatial variations in a structure of the plate and additional optical system variations. For example, the size of phosphor grains typically may be of a similar size as that of the pixel that leads to small variations in image intensity if uncorrected. Further, it is required to minimize structure noise to less than +/−0.1% of peak signal levels.

One of the commonly known correction techniques includes scanning a generic test plate exposed with a uniform X-ray radiation pattern and further using resultant array of values to produce a calibration image. The calibration image is used to compensate for large-scale grain noise and variation in optical transmission in a detection system. To achieve a highest signal-to-noise ratio in a range of greater than 200-300 to 1, detector elements need to be repositioned exactly each time a specific plate is read. Further, each detector pixel needs to be placed within a small fraction of a phosphor grain diameter.

However, it is not possible to passively mechanically align a plate relative to the detector elements to guarantee translation errors and rotational errors less than a desirable range due to large size and inherent flexibility of the plate. Moreover, most fixturing methods in use typically cause damage to a surface of the plate if improperly adjusted, thus limiting reuse of the plate.

Therefore, an improved system and method for correcting spatial luminance variation is desirable to address one or more of the aforementioned issues.

BRIEF DESCRIPTION

In accordance with an embodiment of the invention, a computed radiography plate is provided. The computed radiography plate includes a substrate. The computed radiography plate also includes at least one phosphor layer disposed above the substrate. The computed radiography plate also includes a protective layer disposed above the phosphor layer. The computed radiography plate further includes multiple patterns inscribed in at least one of the phosphor layer or the protective layer or the substrate.

In accordance with another embodiment of the invention, a system for correcting luminance variation in a computed radiography plate is provided. The system includes a carriage configured to move along a length of the plate. The carriage includes one or more imaging detectors configured to move to predefined locations on a surface of the computed radiography plate. The carriage also includes one or more sensors configured to read a pattern on the plate and detect the error in position or orientation of the one or more imaging detectors relative to the pattern. The carriage further includes one or more actuators configured to adjust translation and angular orientation of the one or more imaging detectors in response to a signal from the one or more sensors. The system also includes a microprocessor coupled to the one or more detectors and the one or more actuators, the microprocessor being configured to store a calibration image of the computed radiography plate.

In accordance with another embodiment of the invention, a method for manufacturing a computed radiography plate is provided. The method includes disposing a substrate. The method also includes determining patterning of the substrate. The method further includes forming multiple patterns within or on the substrate based upon the determination. The method also includes disposing at least one phosphor layer on the substrate. The method also includes forming multiple patterns within or on the phosphor layer based upon the determination. The method also includes disposing a protective layer on the at least one phosphor layer. The method further includes determining patterning of the at least one protective layer. The method further includes forming a plurality of patterns within or on the protective layer based upon the determination.

In accordance with another embodiment of the invention, a method of patterning a computed radiography plate is provided. The method includes providing a computed radiography plate, wherein the computed radiography plate includes a substrate. The computed radiography plate also includes at least one phosphor layer disposed above the substrate. The computed radiography plate also includes a protective layer disposed above the phosphor layer. The computed radiography plate further includes multiple patterns inscribed within or on at least one of the phosphor layer or the protective layer or the substrate layer.

These and other advantages and features will be more readily understood from the following detailed description of preferred embodiments of the invention that is provided in connection with the accompanying drawings.

DETAILED DESCRIPTION

As discussed in detail below, embodiments of the invention include a system and method for correcting spatial luminance variation of computed radiography plates. The system and method provide a means to accurately position a reading array to a tolerance of at least less than one pixel during readout, by creating spatially-invariant fixed patterns that act as position encoder tracks, on the computed radiography plates.

Figure 1:
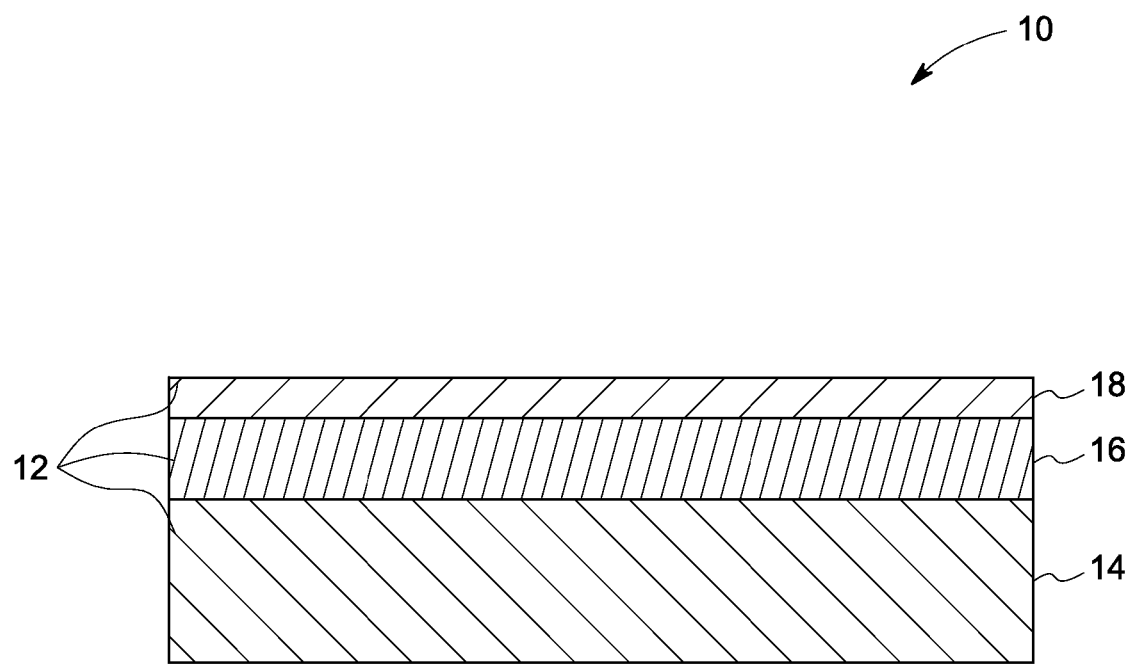
FIG. 1 is a cross-sectional view of a computed radiography plate including a pattern in accordance with an embodiment of the invention.

FIG. 1 is a cross-sectional view of a computed radiography plate 10 including multiple patterns 12. The computed radiography plate 10 includes a substrate 14. In a particular embodiment, the substrate 14 includes a plastic material. In another embodiment, the substrate 14 is opaque. At least one phosphor layer 16 is disposed on the substrate 14. In an embodiment, the phosphor layer 16 includes a thickness between about 0.1 mm to about 0.2 mm. A protective layer 18 is disposed on the phosphor layer 16. In one embodiment, the protective layer 18 includes a plastic material. In another embodiment, the protective layer includes a thickness between about 0.01 mm to about 0.02 mm. The multiple patterns 12 are inscribed into or onto at least one of the phosphor layer 16 or the protective layer 18 or the substrate 14. Although the patterns 12 have been shown to be in the phosphor layer 16 and the protective layer 18, it will be appreciated that the patterns 12 may also be formed within the substrate 14 or on a rear surface of the substrate 14. The multiple patterns 12 are placed into or onto the protective layer 18, the phosphor layer 16 or the substrate 14 such that they do not interfere with a reading of an impressed X-ray image and allow correct alignment of multiple imaging detector elements with an image pixel array to be established.

Figure 2:
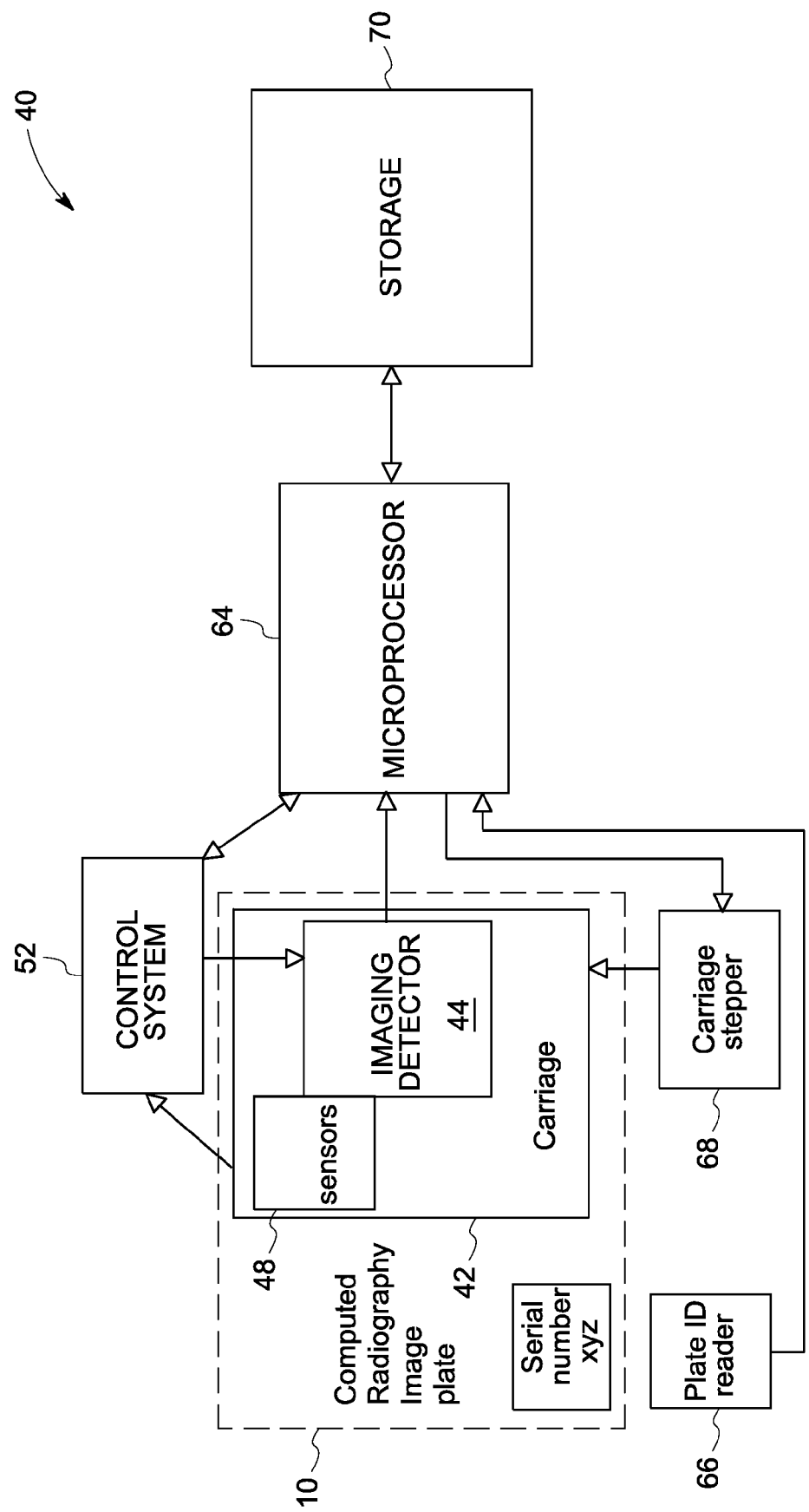
FIG. 2 is a block diagram representation of a system for correcting spatial luminance variation in the computed radiography plate of FIG. 1 in accordance with an embodiment of the invention.
Figure 3:
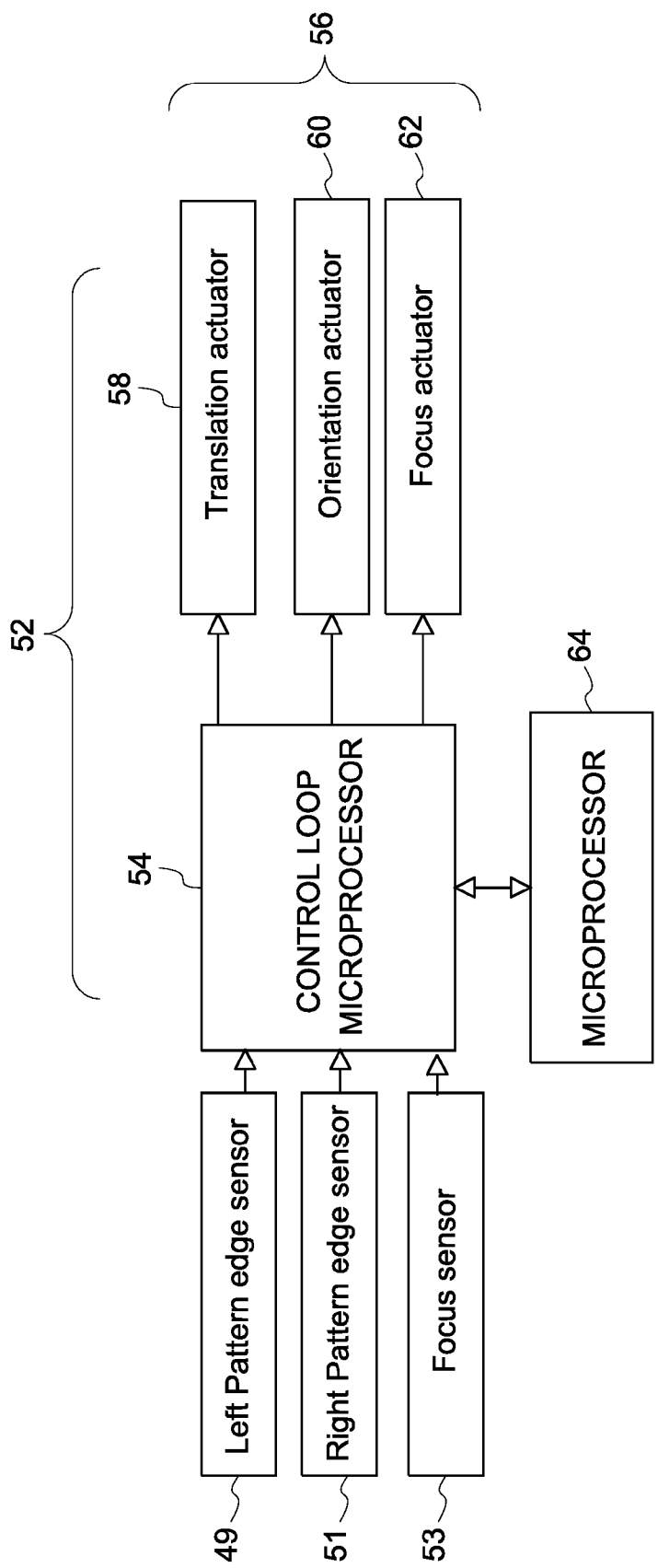
FIG. 3 is a block diagram representation of a control system used in the system in FIG. 2.

FIGS. 2 and 3 are block diagram representations of a system 40 for correcting luminance variation in the computed radiography plate 10 in FIG. 1. The system 40 includes a carriage 42 that moves along a length of the plate 10. The carriage 42 includes one or more imaging detectors 44 configured to move to predefined locations on a surface of the computed radiography plate 10. The imaging detectors 44 are sensitive to the stimulated emission of each pixel of a previously stored 2-D X-ray image. Since the field of view of the imaging detectors 44 does not encompass an entire surface area of the plate 10, the imaging detectors 44 are moved to a sequence of locations sufficient to build up a complete image impressed onto the plate 10. In one embodiment, a relative motion is accomplished either by moving the carriage 42 with the plate 10 remaining stationary, wherein physical edges of the plate 10 are fixed by a set of guides or pins in approximately a correct orientation. In another embodiment, the plate 10 is moved with the carriage 42 stationary in a vertical direction, while adjusting translation and angular orientation of the imaging detectors 44 allowing small corrections in translation and angular movements of 44 to occur with respect to a pixel pattern on the plate 10. In a particular embodiment, the imaging detectors 44 include a linear array of 1×N pixels that reads a row of pixels at a time. The carriage 42 is configured to move along a length of the plate 10 row-by-row to build up a final array of values corresponding to a resultant image for the plate 10. In another embodiment, the imaging detectors 44 include a two-dimensional array of K×L pixels, and the carriage 42 is configured to move sequentially to a small number of (x, y) locations and acquires a corresponding set of small two dimensional images. The two dimensional images are "stitched" together to yield a final image of the plate 10. One or more sensors 48 are coupled to the detectors 44 and are configured to read a permanent pattern placed on the plate 10 and thereby continuously measure the error in the position and orientation of the one or more detectors 44 relative to the pixel pattern on the plate 10. The sensors 48 are insensitive to photostimulated luminescence (PSL) light emitted by the pixels of the plate 10. The alignment and orientation errors are used to control corrective motion of the imaging detector 44 so as to precisely align the imaging detector 44 with the pre-stored pixels of plate 10 each time the imaging detector 44 is readout. In an exemplary embodiment, as shown in FIG. 3, the sensors 48 include a right edge pattern sensor 49, a left edge pattern sensor 51 and a focus sensor 53.

A control system 52, including a control loop microprocessor 54 (FIG. 3) and one or more actuators 56, is coupled to the detectors 44 and the sensors 48. The detectors 44 are actuated via the actuators 56 once an error is detected in a translation or an angular orientation of the detectors 44. In one embodiment, the actuators 56 include micro-actuators. In another embodiment, as shown in FIG. 3, the actuators 56 include a translation actuator 58, a rotational actuator 60 and a focus actuator 62. A microprocessor 64 is coupled to the one or more detectors 44 and stores a calibration image of the complete computed radiography plate 10 provided by the detectors 44. A plate identification reader 66 retrieves a serial number of the plate 10 and inputs the serial number to the microprocessor 64. The serial number identification allows the microprocessor 64 to compare information received from the detectors 44 and the control system 52 to the calibration image associated with the plate 10. The microprocessor 64 is also coupled to a carriage stepper 68 that actuates the carriage 42 based upon the status received from the control system 52. A storage site 70 is connected to the microprocessor 64 on a network and receives and stores a corrected image of the plate 10. In a particular embodiment, the network is a wired local area network. In another embodiment, the network is a wireless network. In yet another embodiment, the storage site 70 is at a remote location or a local storage.

It should be noted that embodiments of the invention are not limited to any particular processor for performing the processing tasks of the invention. The term "microprocessor," as that term is used herein, is intended to denote any machine capable of performing the calculations, or computations, necessary to perform the tasks of the invention. The term "microprocessor" is intended to denote any machine that is capable of accepting a structured input and of processing the input in accordance with prescribed rules to produce an output.

Figure 4:
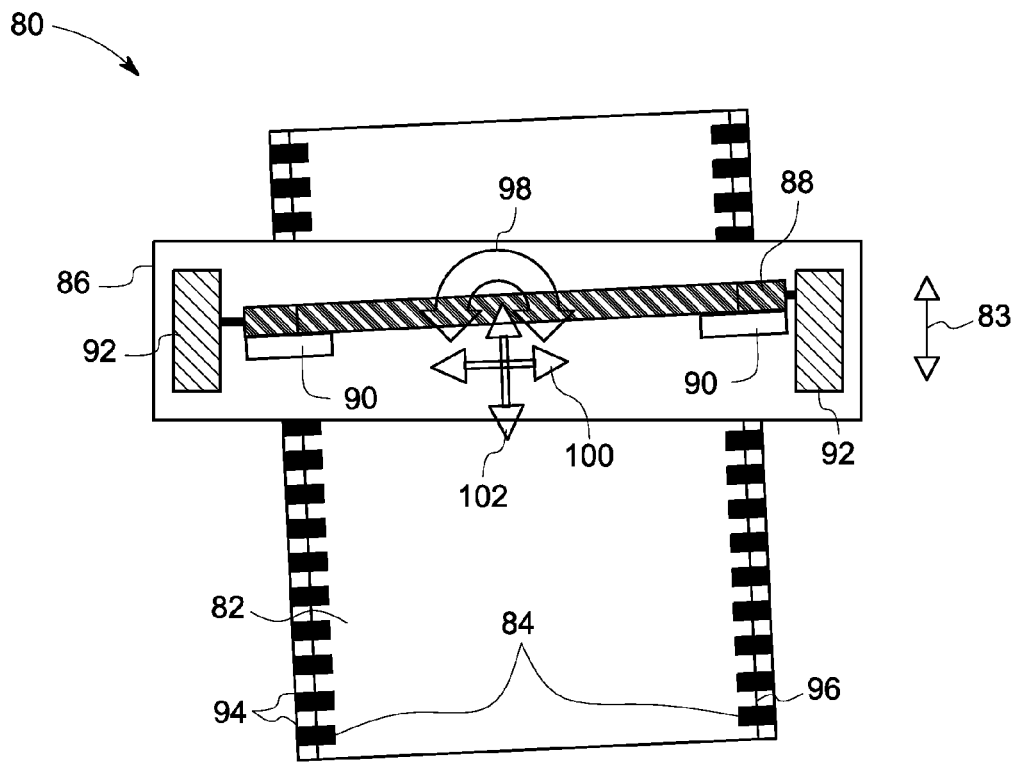
FIG. 4 is a diagrammatic illustration of a placement of the system in FIG. 2 to correct spatial luminance variation.

FIG. 4 is a diagrammatic illustration of a system 80 placed on a radiography plate 82 including an exemplary pattern 84. A carriage 86 includes a detector bar 88 that is coupled to multiple sensors 90 and microactuators 92. The carriage 86 traverses along a length of the plate 82 in a direction 83. The detector bar 88 is aligned on the plate 82 using the pattern 84. The exemplary pattern 84 includes multiple horizontal stripes 94 and a vertical stripe 96. The detector bar 88 is free to rotate along a direction 98 and translate in directions 100 and 102 respectively. Although it has been illustrated herein to use the system 80 with the plate 82, it should be appreciated that the system 80 may also be employed with the plate 10.

Figure 5:
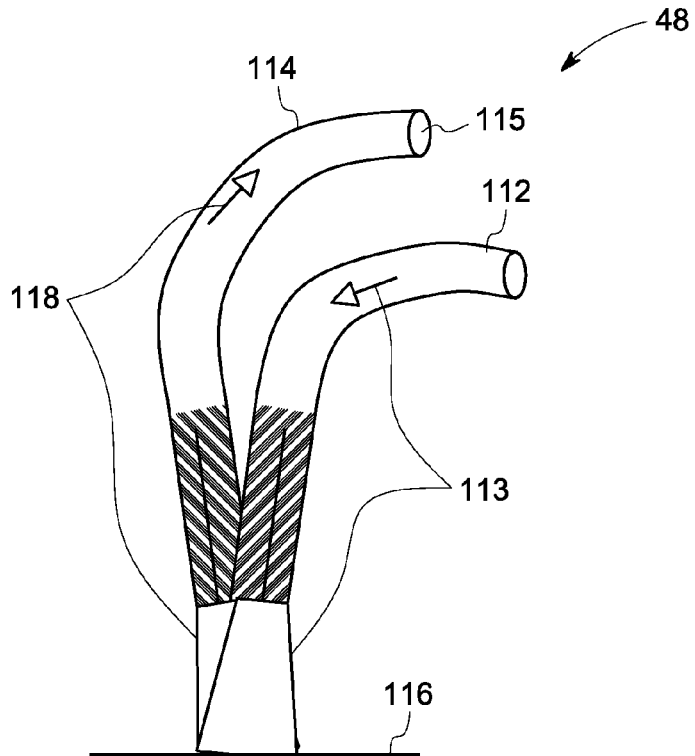
FIG. 5 is a diagrammatic illustration of sensors employed in the system in FIG. 2.

FIG. 5 is a diagrammatic illustration of one of an exemplary pair of sensors 90, as referenced in FIG. 4. Each sensor 48 includes a pair of optical fibers having a transmitting optical fiber 112 and a receiving optical fiber 114. The transmitting optical fiber 112 is configured to deliver light on a surface 116 of the computed radiography plate 10 and the receiving optical fiber 114 receives reflected light from the surface 116 of the computed radiography plate 10. The sensors 48, as shown, detect changes in surface reflectivity between areas of the surface 116 that have been patterned and not patterned. In one embodiment, patterns are created by modifying a directional surface reflectivity of surface 116, which corresponds to the top of the protective layer 18 in FIG. 1. A technique such as, but not limited to, sandblasting destroys highly directional or specular light reflectivity of the native surface 116 in areas of the pattern which greatly reduces reflected light carried by the fiber 114 when the sensor 48 (FIG. 2) is positioned over a marked area. The angle between the transmitting optical fiber 112 and a surface normal of the surface 116 is the same as the angle between the receiving optical fiber 114 and the surface normal of the surface 116 which maximizes light delivered by the receiving optical fiber 114 for highly specular surfaces 116 and causes detected light in the receiving optical fiber 114 to drop significantly when specularity of the surface 116 is destroyed. Since the detecting aperture of each element of the detector bar 88 (FIG. 4) is perpendicular to surface 116 and is fairly large, the detected PSL light emitted through surface 116 is largely unaffected by modest reflectivity variations of the surface 116. In a particular embodiment, a colored transmission filter 115 is disposed on the receiving optical fiber 114 for detecting inks printed on the surface 116. In another embodiment, the colored transmission filter 115 may be replaced by a polarization sensitive film sensitive to changes in polarization due to the patterns on the surface 116. The output of the receiving optical fiber 114 after possible passage through an auxiliary optical element 115 is coupled to a detector such as, but not limited to, a photodiode. An output signal from the receiving optical fiber 114 is normalized by dividing it by a signal proportional to an optical output 113 of the transmitting optical fiber 112 to provide a resultant signal independent of temporal light emission fluctuations.

The resolution of the sensor 48 is governed by the size of the intersection of the areas of light incident on surface 116 from fiber 112 and the area of the field of view of fiber 114. In order to accurately measure position with sub-pixel accuracy, the sensitive area of sensor 48 is designed to be approximately equal to the pixel size on plate 10. As the field of view of the sensor 48 increases for a fixed pattern feature size, the ability to measure sub-pixel positions degrades. In another embodiment, the sensing function may be implemented using discrete optical emitters and imaging detectors along with suitable lenses and apertures without the use of optical fibers. In a particular embodiment, the discrete optical emitters and imaging detectors may be used in conjunction with lenses, apertures, phototransistors and light emitting diodes.

Figure 6:
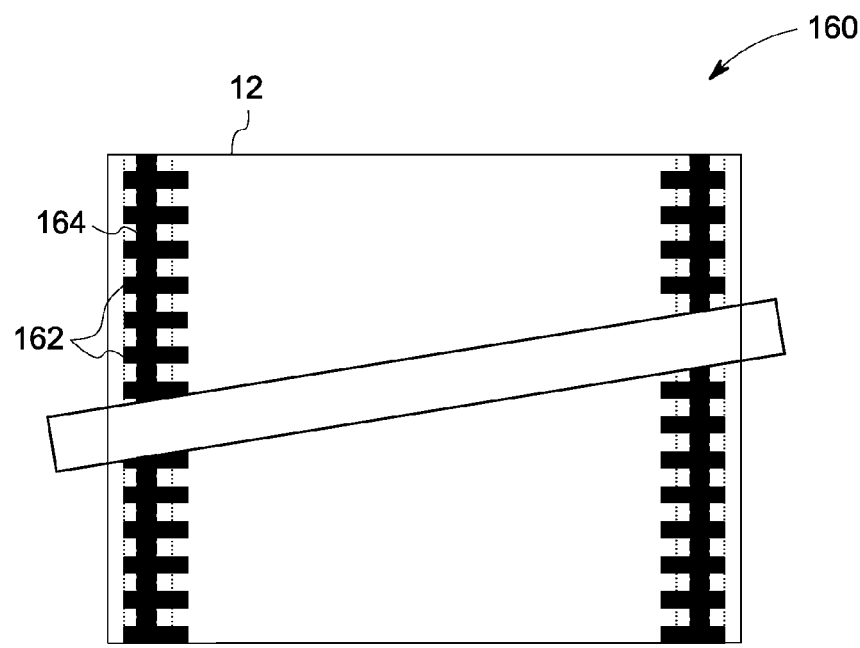
FIG. 6 is a schematic illustration of an exemplary tracking pattern on the computed radiography plate.

FIG. 6 is a schematic illustration of an exemplary pattern 160 on the computed radiography plate 12 useful for simultaneously deriving lateral translation errors in a vertical and a horizontal direction and angular orientation errors. The pattern 160 includes multiple horizontal stripes 162 that measure vertical mis-alignments and multiple vertical stripes 164 that measure horizontal mis-alignments that together enable horizontal and vertical tracking as well as measurement of angular mis-alignment. The individual stripes 162 are typically one pixel high and from 1 to 5 pixels wide and are spaced one to two pixels apart vertically. The vertical stripes 164 typically are one to two pixels wide and run the height of the plate 12. Although the pattern 160 has been illustrated herein for simplification, it will be appreciated that several other patterns may be employed.

Figure 7:
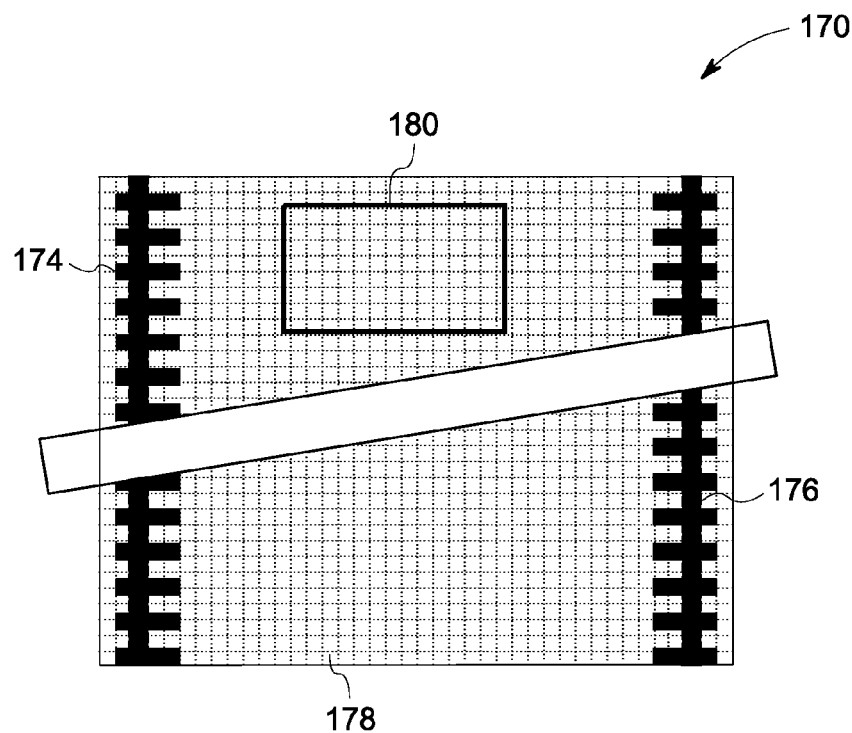
FIG. 7 is a schematic illustration of yet another exemplary tracking pattern showing positioning of a two dimensional imaging detector with respect to a two dimensional pixel grid on the computed radiography plate.

FIG. 7 is a schematic illustration showing the use of alignment patterns to allow the use of a two dimensional imaging detector when reading plate 10 (FIG. 1). In a particular embodiment, a two dimensional K×L element detector array is used to read the plate. The detector array needs to be accurately aligned and oriented to an underlying image pixel grid 178. Patterns 174 and 176 (applied to plate 10) allow the field of view of a 2D imaging detector 180 to be kept aligned with respect to the underlying pixels 178 of the plate 10.

Figure 8:
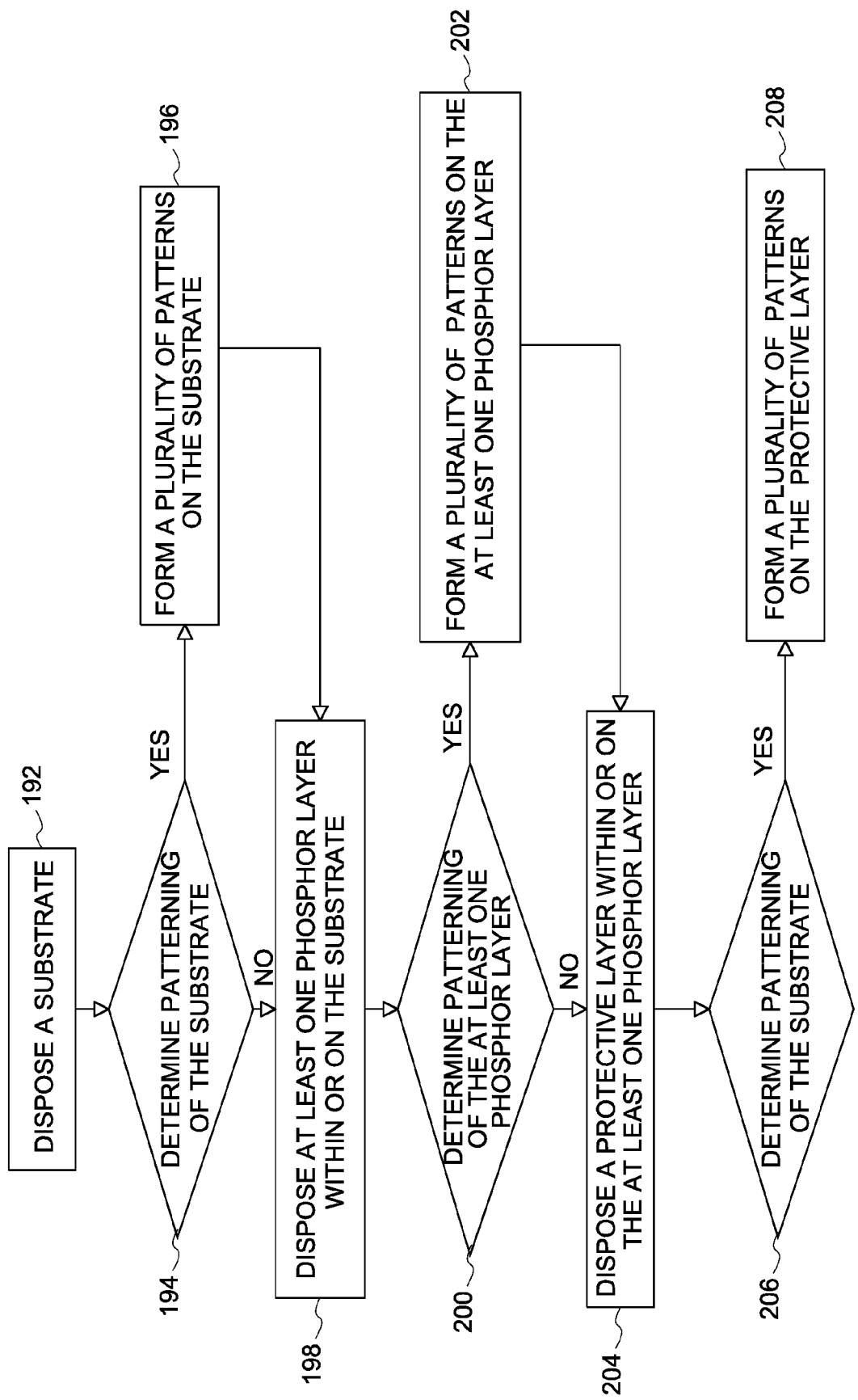
FIG. 8 is a flow chart representing steps in a method for manufacturing a computed radiography plate.

FIG. 8 is a flow chart representing steps in an exemplary method for manufacturing a computed radiography plate, such as a plate 10 (FIG. 1). The method includes disposing a substrate, such as a substrate 14 (FIG. 1), in step 192. It is determined whether the substrate needs to be patterned in step 194. Multiple patterns are formed on the substrate 14 in step 196 if patterning is desired in step 194. In a particular embodiment, multiple patterns may be formed on a rear surface of the substrate. At least one phosphor layer, such as the phosphor layer 16 (FIG. 1), is disposed on the substrate in step 198 either after step 192 or step 196 based upon the determination in step 194. Further, a decision is made regarding patterning the phosphor layer in step 200. Multiple patterns are formed on the phosphor layer in step 202 if patterning is desired in step 200. At least one protective layer, such as the protective layer 18 (FIG. 1), is disposed on the phosphor layer in step 204 either after step 198 or step 202 based upon the determination in step 200. A decision is made regarding patterning the protective layer in step 206. Multiple patterns are formed on the protective layer in step 208 based upon step 206. In an exemplary embodiment, the patterns are formed on a rear surface of the protective layer.

In one embodiment, the multiple patterns are formed via laser etching. In another embodiment, the multiple patterns are mechanically embossed. In yet another embodiment, a surface property such as, but not limited to, angular reflectivity, spectral reflectivity and polarization state of reflected light is modified to detect presence of the pattern. In an exemplary embodiment, the patterns are formed together after disposition of the substrate, the phosphor layer and the protective layer.

Figure 9:
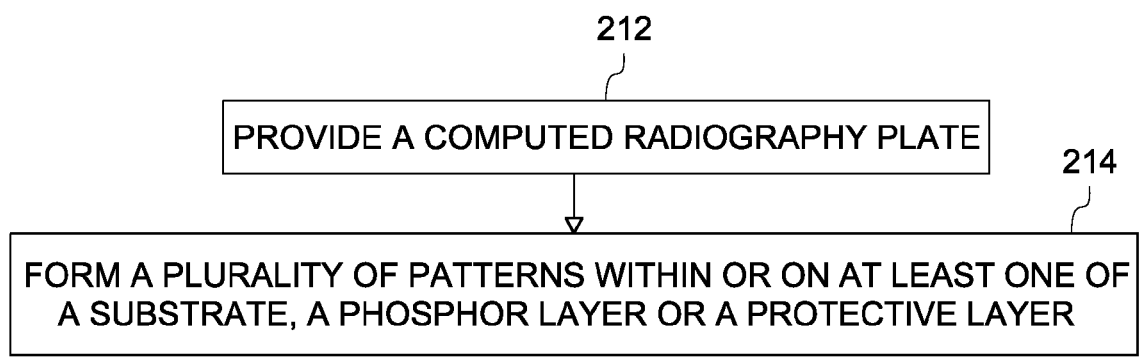
FIG. 9 is a flow chart representing steps in a method of patterning a computed radiography plate.

FIG. 9 is a flow chart representing steps in an exemplary method of patterning a previously manufactured computed radiography plate. The method includes providing a computed radiography plate, such as the plate 10 (FIG. 1), in step 212. The computed radiography plate 10 includes a substrate 14, at least one phosphor layer 16 on the substrate 14, and a protective layer 18 on the phosphor layer 16. Multiple patterns can be formed on or within each of the substrate, the phosphor layer and the protective layer in step 214. In an exemplary embodiment, the patterns are formed via focusing a laser below the protective layer. In a particular embodiment, the multiple patterns are formed via laser etching. In another embodiment, the multiple patterns are mechanically embossed. In yet another embodiment, a surface property such as, but not limited to, angular reflectivity, spectral reflectivity and polarization state of reflected light is modified to detect presence of the pattern. In another embodiment, the patterns are formed on a rear surface of the substrate 14.

The various embodiments of a system and method for correcting spatial luminance variation in computed radiography plates described above thus provide a way to achieve high image quality at a reasonable cost. The system and method also eliminates read-out artifacts such as, but not limited to, streaks, banding commonly observed and with a signal to noise amplification by a factor of about 2 to about 10. Further, the system allows for detection of smaller flaws that cannot be commonly detected.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the use of a sensor with a polarization film with respect to one embodiment can be adapted for use with a computed radiography plate inscribed with a two dimensional grid pattern. Similarly, the various features described, as well as other known equivalents for each feature, can be mixed and matched by one of ordinary skill in this art to construct additional systems and techniques in accordance with principles of this disclosure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A computed radiography plate comprising:
   a substrate;
   at least one phosphor layer disposed above the substrate;
   a protective layer disposed above the phosphor layer; and
   a plurality of patterns inscribed within or on the phosphor layer, and the protective layer, and the substrate.

2. The computed radiography plate of claim 1, wherein the phosphor layer comprises a flexible layer.

3. The computed radiography plate of claim 1, wherein the substrate or the protective layer comprises a plastic material.

4. The computed radiography plate of claim 1, wherein the phosphor layer comprises a thickness between about 0.1 mm to about 0.2 mm.

5. The computed radiography plate of claim 1, wherein the protective layer comprises a thickness between about 0.01 mm to about 0.02 mm.

6. The computed radiography plate of claim 1, wherein the patterns are configured to allow simultaneous measurement of translation and orientation error of an imaging detector with respect to an underlying image pixel grid.

7. A system for correcting luminance variation in a computed radiography plate comprising:
   a carriage configured to provide a relative motion along a length of the plate, the carriage comprising:
   one or more imaging detectors configured to move to predefined locations on a surface of the computed radiography plate, the detectors further configured to be sensitive to photo stimulated luminescence;
   one or more sensors configured to read a pattern on the plate and detect an error in a position or an orientation of the one or more detectors relative to the pattern, the sensors further configured to be insensitive to photo stimulated luminescence; and
   one or more actuators configured to adjust translation and angular orientation of the one or more detectors in response to a signal from the one or more sensors; and
   a microprocessor coupled to the one or more imaging detectors and the one or more actuators, the microprocessor being configured to store a calibration image of the computed radiography plate.

8. The system of claim 7, wherein the one or more imaging detectors comprise at least one of a linear array or a two dimensional array.

9. The system of claim 7, wherein the one or more sensors comprise at least one pair of optical fibers having a transmitting optical fiber and a receiving optical fiber, wherein the transmitting optical fiber is configured to deliver light and the receiving optical fiber is configured to receive reflected light from the surface of the computed radiography plate.

10. The system of claim 7, wherein the one or more sensors comprise a plurality of discrete optical elements.

11. The system of claim 10, wherein the plurality of discrete optical elements comprise lenses, apertures, phototransistors and light emitting diodes.

12. The system of claim 7, wherein the one or more actuators comprise micro-actuators.

13. The system of claim 7, wherein the one or more imaging detectors are configured to correct sub-pixel translation errors within a plurality of resolutions.

14. The system of claim 13, wherein the resolutions comprise 25 microns, 50 microns, and 100 microns.

15. The system of claim 9, comprising a radio frequency identification reader configured to retrieve the calibration image.

16. A method for manufacturing a computed radiography plate comprising:
   disposing a substrate;
   determining patterning of the substrate;
   forming a plurality of patterns within or on the substrate based upon the determination;
   disposing at least one phosphor layer on the substrate;
   determining patterning of the at least one phosphor layer;
   forming a plurality of patterns on the at least one phosphor layer based upon the determination;
   disposing a protective layer within or on the at least one phosphor layer;
   determining patterning of the at least one protective layer; and
   forming a plurality of patterns within or on the protective layer based upon the determination.

17. The method of claim 16, wherein the forming comprises laser etching the patterns.

18. The method of claim 16, wherein the forming comprises mechanical embossing the patterns.

19. The method of claim 16, wherein the forming comprises modifying a plurality of polarization properties of the patterns.

20. A method of patterning a computed radiography plate comprising:
   providing a computed radiography plate, comprising:
   a substrate;
   at least one phosphor layer on the substrate; and
   a protective layer on the phosphor layer; and
   forming a plurality of patterns within or on the protective layer, and the phosphor layer, and the substrate.

21. The method of claim 20, wherein the forming comprises laser etching the patterns.

22. The method of claim 20, wherein the forming comprises mechanical embossing the patterns.

23. The method of claim 20, wherein the forming comprises modifying a plurality of polarization properties of the patterns.

* * * * *